(12) United States Patent
Xu (10) Patent No.: US 11,798,230 B2
(45) Date of Patent: Oct. 24, 2023

(54) DISPLAY DATA PROCESSING METHOD, DEVICE AND TERMINAL, DISPLAY METHOD AND DEVICE, AND READABLE STORAGE MEDIUM

(71) Applicant: ZTE CORPORATION, Guangdong (CN)

(72) Inventor: Yuanyuan Xu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/617,366

(22) PCT Filed: Aug. 7, 2020

(86) PCT No.: PCT/CN2020/107753
§ 371 (c)(1),
(2) Date: Dec. 8, 2021

(87) PCT Pub. No.: WO2021/031883
PCT Pub. Date: Feb. 25, 2021

(65) Prior Publication Data
US 2022/0254103 A1    Aug. 11, 2022

(30) Foreign Application Priority Data
Aug. 19, 2019 (CN) .......................... 201910765386.8

(51) Int. Cl.
*G06T 17/20* (2006.01)
*G06F 3/14* (2006.01)

(52) U.S. Cl.
CPC ................ *G06T 17/20* (2013.01); *G06F 3/14* (2013.01)

(58) Field of Classification Search
None
See application file for complete search history.

(56) References Cited

U.S. PATENT DOCUMENTS

| 6,166,728 | A | * | 12/2000 | Haman | .................. | H04N 7/088 |
| | | | | | | 348/E7.024 |
| 10,419,742 | B2 | | 9/2019 | Xie | | |
| 2007/0273609 | A1 | * | 11/2007 | Yamaguchi | ........... | G06F 3/1423 |
| | | | | | | 345/1.1 |

(Continued)

FOREIGN PATENT DOCUMENTS

| CN | 105678684 A | 6/2016 |
| CN | 106775382 A | 5/2017 |

(Continued)

OTHER PUBLICATIONS

WIPO, International Search Report dated Nov. 4, 2020.
European Patent Office, The extended European search report dated Aug. 21, 2023 for application No. EP20854824.8.

*Primary Examiner* — Sultana M Zalalee
(74) *Attorney, Agent, or Firm* — Li & Cai Intellectual Property (USA) Office (57) ABSTRACT

Embodiments of the present disclosure provide a display data processing method, device and terminal, a display method and device and a readable storage medium. The display data processing method includes: acquiring a display data saving instruction; and storing, when a display screen deforms, display data and a state parameter of display screen corresponding to the display screen to obtain a display data processing result.

15 Claims, 7 Drawing Sheets

(56) References Cited

U.S. PATENT DOCUMENTS

| | | | |
|---|---|---|---|
| 2011/0211806 A1* | 9/2011 | Newton | H04N 13/30 386/230 |
| 2013/0278486 A1* | 10/2013 | Duerksen | G09G 3/20 345/55 |
| 2014/0009449 A1* | 1/2014 | Jang | G09G 3/03 345/204 |
| 2014/0111417 A1 | 4/2014 | Son | |
| 2014/0313142 A1* | 10/2014 | Yairi | H04M 1/724 345/173 |
| 2015/0309704 A1* | 10/2015 | Bae | G06F 3/04883 715/765 |
| 2016/0019703 A1 | 1/2016 | Tian | |
| 2016/0092033 A1* | 3/2016 | Porter | G06T 17/05 345/647 |
| 2016/0179295 A1* | 6/2016 | Liang | H04L 67/148 715/740 |
| 2017/0052566 A1* | 2/2017 | Ka | G09G 3/035 |
| 2017/0118409 A1* | 4/2017 | Im | H04N 23/6812 |
| 2017/0132742 A1* | 5/2017 | Deluca | G06T 11/60 |
| 2018/0224340 A1* | 8/2018 | Koppal | G01L 1/205 |
| 2019/0324620 A1* | 10/2019 | Gu | G06F 3/14 |
| 2020/0004297 A1* | 1/2020 | Rekapalli | G06F 1/1618 |
| 2020/0333834 A1* | 10/2020 | Seo | G06F 3/1446 |

FOREIGN PATENT DOCUMENTS

| | | |
|---|---|---|
| CN | 108459805 A | 8/2018 |
| CN | 109739421 A | 5/2019 |

\* cited by examiner

DISPLAY DATA PROCESSING METHOD, DEVICE AND TERMINAL, DISPLAY METHOD AND DEVICE, AND READABLE STORAGE MEDIUM

TECHNICAL FIELD

The present disclosure relates to, but is not limited to, the field of image processing technology.

BACKGROUND

A displayed image usually deforms to some extent according to the foldability of a flexible screen. Such deformation may affect the display effect, but sometimes may produce a peculiar display effect. A current screen capture method can record a full image displayed by a display component, but cannot record a deformation effect. Thus, a requirement of a user for recording an actual display effect of a flexible screen cannot be met, resulting in poor user experience.

SUMMARY

An embodiment of the present disclosure provides a display data processing method, including: acquiring a display data saving instruction; and storing, when a display screen deforms, display data and a state parameter of display screen corresponding to the display screen to obtain a display data processing result.

An embodiment of the present disclosure further provides a display method, including: acquiring the display data processing result described herein; when a type of the display data processing result includes a source file and a three-dimensional model, determining whether a current display screen is capable of deforming according to the state parameter of display screen; if so, deforming the current display screen according to the state parameter of display screen, and displaying a tiled image on the current display screen; otherwise, displaying the display data processing result in the type of three-dimensional model on the current display screen.

An embodiment of the present disclosure further provides a display data processing device, including a first acquisition module configured to acquire a display data saving instruction; and a storage module configured to store, when a display screen deforms, display data and a state parameter of display screen corresponding to the display screen to obtain a display data processing result.

An embodiment of the present disclosure further provides a display device, including: a fourth acquisition module configured to acquire the display data processing result described herein; a display module configured to determine whether a current display screen is capable of deforming according to the state parameter of display screen when a type of the display data processing result includes a source file and a three-dimensional model; if so, the display module deforms the current display screen according to the state parameter of display screen, and displays a tiled image on the current display screen; otherwise, the display module displays the display data processing result in the type of three-dimensional model on the current display screen.

An embodiment of the present disclosure further provides a display data processing terminal, including: a processor, a memory and a communication bus. The communication bus is configured to enable connection and communication between the processor and the memory; and the processor is configured to execute one or more computer programs stored in the memory to implement the display data processing method described herein.

An embodiment of the present disclosure further provides a readable storage medium having one or more first computer programs stored therein, and the one or more first computer programs are executable by one or more first processors to implement the display data processing method described herein. Or, the readable storage medium has one or more second computer programs stored therein, and the one or more second computer programs are executable by one or more second processors to implement the display method described herein.

DETAIL DESCRIPTION OF EMBODIMENTS

In order to make the objectives, technical solutions and advantages of the present disclosure clearer, the embodiments of the present disclosure are further described in detail below in conjunction with the exemplary implementations and accompanying drawings. It should be understood that the exemplary embodiments described herein are merely intended to explain the present disclosure, rather than limiting the present disclosure.

First Embodiment

Figure 1:
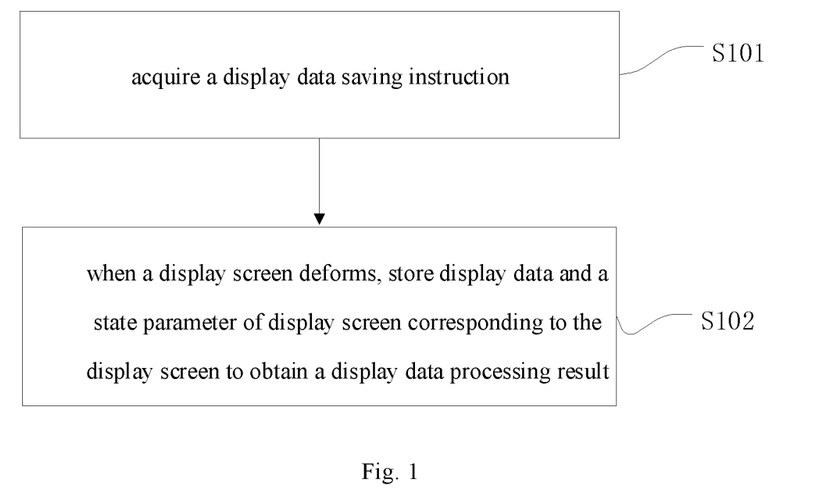
FIG. 1 is a flowchart illustrating a display data processing method according to First Embodiment of the present disclosure.

With reference to FIG. 1, a display data processing method provided by the present embodiment includes:

S101: acquiring a display data saving instruction; and S102: when a display screen deforms, storing display data and a state parameter of display screen corresponding to the display screen to obtain a display data processing result.

It should be noted that the display data saving instruction in the embodiment of the present disclosure may be a screen capture instruction, or other instructions to store or cache display data, such as a photographing instruction, a video recording instruction and a screen recording instruction.

It should be noted that an instruction to store a displayed image or a displayed video is actually an instruction to store display data. Therefore, the instruction to store the displayed image or the displayed video is also included in the display data saving instruction claimed by the embodiment of the present disclosure.

It should be noted that, when the display data saving instruction is a video instruction, the embodiment of the present disclosure may be implemented as storing display data and a state parameter of display screen corresponding to a display screen when the display screen deforms to obtain a display data processing result. For example, if a display screen of a terminal B deforms from the 5th second to the 9th second in a process of making a 1-minute video by the terminal B, the display data and the state parameter of display screen from the 5th second to the 9th second are stored to obtain a display data processing result in a type of (tiled image+state parameter of display screen). It should be noted that, in a case where the display data processing result is a video, a tiled image of the video may be understood as images of all frames of the video.

The display data saving instruction may be sent by a terminal where a deformable display screen is located, or may be an instruction received by the terminal from other servers or other terminals.

It should be noted that at least one of display screens of a terminal in which the embodiment of the present disclosure is implemented is a deformable display screen. For example, the terminal includes at least one flexible screen.

In some embodiments, a type of the display data processing result includes at least one of a source file or a three-dimensional model, and the source file includes a tiled image derived from the display data and the state parameter of display screen.

In some embodiments, the type of the data processing result may be a tiled image, so as to allow a user to share the tiled image with a mobile phone having a non-deformable display screen, or improve processing efficiency when the user only needs to store the tiled image.

In some embodiments, when the type of the display data processing result includes the three-dimensional model, after the acquiring the display data saving instruction, the method further includes: acquiring a preset basic model; adjusting the basic model according to the state parameter of display screen to obtain a deformation model corresponding to the state parameter of display screen; and performing a mapping process on the tiled image and the deformation model to obtain the display data processing result in the type of three-dimensional model.

It should be noted that the preset basic model may be preset according to a state parameter of display screen of the terminal. The preset basic model may also be obtained by setting according to the state parameter of display screen of the terminal and then adjusting by the user according to his/her preference.

It should be noted that, the mapping process of the tiled image and the deformation model may be performed in a pixel-to-pixel manner to obtain a three-dimensional model which restores an image displayed on the display screen when the terminal deforms and the display data saving instruction is received. For example, when a current state of a display screen is a folded state at a certain angle and an effect of a displayed image observed by the user is a state A, a display data processing result in the type of three-dimensional model, which is currently obtained by applying the method provided by the embodiment of the present disclosure, presents a three-dimensional image of the state A in the folded state at the certain angle.

In some embodiments, after the performing the mapping process on the tiled image and the deformation model, the method further includes: performing image adjustment; and obtaining the display data processing result in the type of three-dimensional model.

It should be noted that the image adjustment in some embodiments includes, but is not limited to, at least one of: zooming, rotating, adjusting brightness, adjusting contrast, adding a sticker, adding text, or adding music. For example, when the obtained display data processing result in the type of three-dimensional model is at an angle A but an actual viewing angle of the user is an angle B, the user may adjust the angle of the display data processing result, so as to obtain the display data processing result which meets real needs of the user better.

In some embodiments, the state parameter of display screen includes, but is not limited to, at least one of: a display parameter of display screen or a deformation parameter of display screen.

It should be noted that the display parameter of display screen includes, but is not limited to, at least one of: the number of display screens or a full tile resolution of all sub-screens of a display screen.

In some embodiments, the deformation parameter of display screen is related to a deformation type of the display screen, and the deformation parameter of display screen is illustrated below by taking display screens in two common deformation types as an example. It should be noted that an exemplary description is given below, and for display screens in other deformation types, a well-known deformation parameter thereof or a deformation parameter thereof known by those of ordinary skill in the art may be used as the deformation parameter of display screen.

Figure 2A:
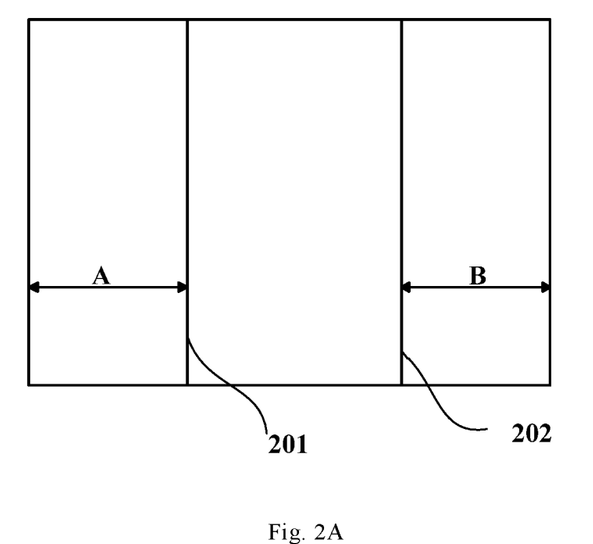
FIG. 2A is a schematic structural diagram illustrating an undeformed state of an axially foldable display screen of a flexible system.
Figure 2B:
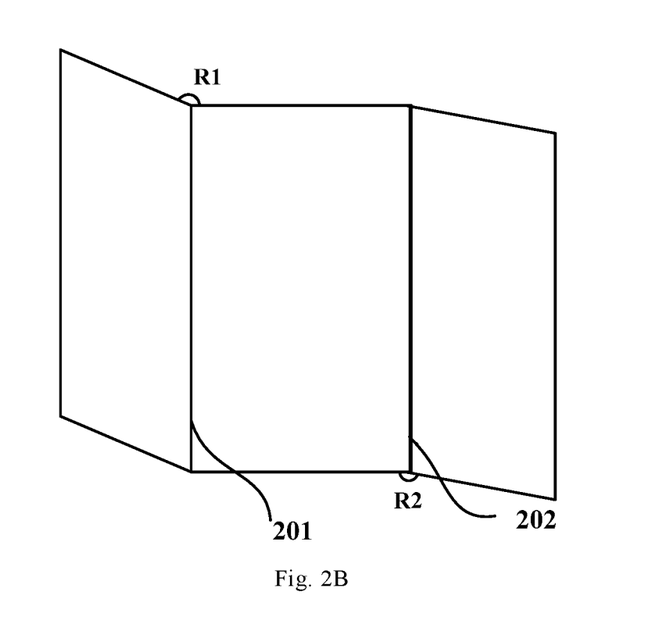
FIG. 2B is a schematic structural diagram illustrating a state of the display screen shown in FIG. 2A after the display screen deforms.

For an axially foldable display screen of a flexible system, the deformation parameter of display screen includes, but is not limited to, at least one of: the number of axes, a position of each axis, a bending direction of each axis, a rotation angle of each axis and curvature. It should be noted that the position of each axis may be marked by coordinate points in a preset coordinate system or marked with other feasible methods, and the method of marking the position of each axis is not limited in the embodiment of the present disclosure. It should be noted that the axes may be parallel to one another or not, which is not limited herein. FIG. 2A is a schematic diagram illustrating an undeformed state of an axially foldable display screen of a flexible system, the display screen includes a first axis 201 located at a position having a distance A from a left side of the display screen, and a second axis 202 located at a position having a distance B from a right side of the display screen. FIG. 2B is a schematic diagram illustrating a state of the display screen shown in FIG. 2A after the display screen deforms. In such state, the deformation parameter of display screen further includes a downward bending direction of the first axis 201, an upward bending direction of the second axis 202, a rotation angle R1 of the first axis 201, a rotation angle R2 of the second axis 202, and curvature, and the curvature may be obtained by determining an orthogonal curve of each pixel along an axial direction in the display screen and calculating orthogonal curvature of each orthogonal curve.

Figure 3A:
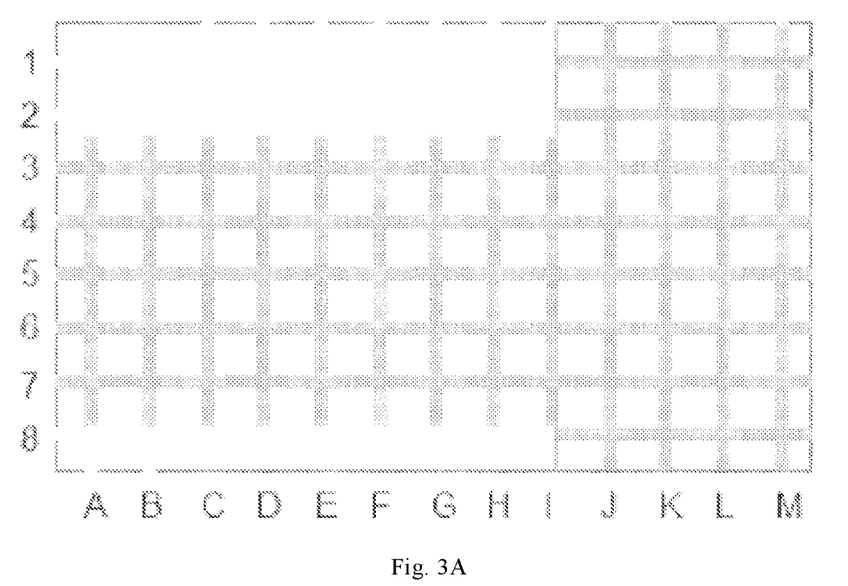
FIG. 3A is a schematic structural diagram illustrating an undeformed state of an array-substrate-type display screen of a flexible system.
Figure 3B:
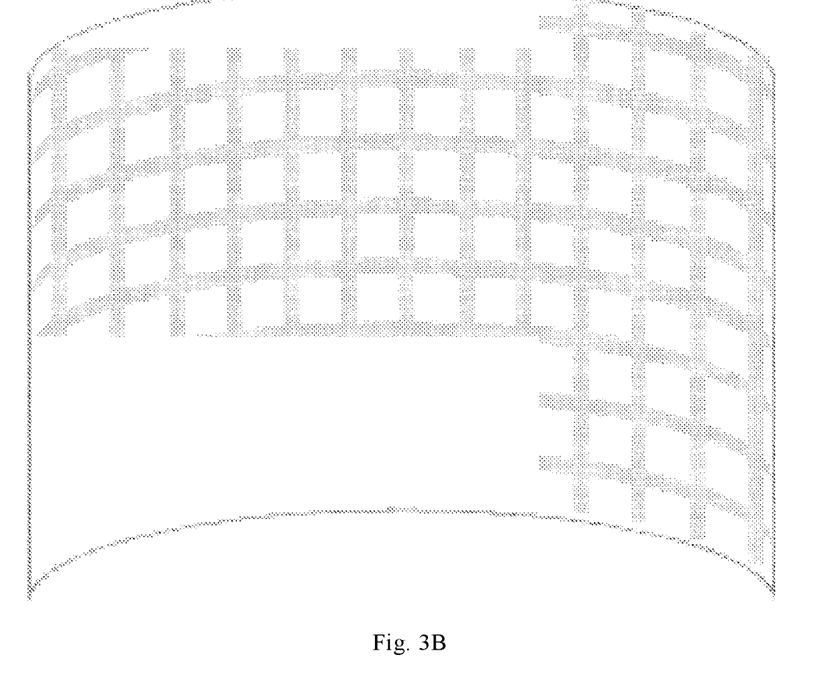
FIG. 3B is a schematic structural diagram illustrating a state of the display screen shown in FIG. 3A after the display screen deforms.

For an array-substrate-type display screen of a flexible system, the deformation parameter of display screen includes, but is not limited to, a layout of array matrices in different directions and curvature. It should be noted that FIGS. 3A and 3B are only used for illustrating the array-substrate-type display screen of the flexible system, and the technical solution of the embodiment of the present disclosure may also be applicable to display screens with other layouts. FIG. 3A is a schematic diagram illustrating an undeformed state of an array-substrate-type display screen of a flexible system, and a layout of array matrices of the display screen is A-M in a horizontal direction and 1-8 in a vertical direction. FIG. 3B is a schematic diagram illustrating a state of the display screen shown in FIG. 3A after the display screen deforms. In such state, the deformation parameter of display screen further includes curvature of each detection point at the center of a detection array, and the curvature is calculated by a formula of $k=2\delta/ED$, where k is curvature of the detection point, $\delta$ is a pressure value of the detection point, E is an elastic modulus of a material of the flexible screen, and D is a thickness of the flexible screen.

In some embodiments, after the acquiring the display data save instruction, the method further includes: acquiring a user intention including a type of a display data processing result; and storing, when the display screen deforms, display data and a state parameter of display screen corresponding to the display screen according to the user intention to obtain the display data processing result.

It should be noted that the user intention may be acquired by popping up a dialogue box in a display interface of the display screen for inquiring the user intention every time, or may be set by the user or a system. Or, a type of a current display data processing result may be automatically set after a learning process is performed according to a user habit.

For example, when the acquired user intention indicates that the user wants to store a source file, only the source file is stored and the time for generating a three-dimensional model is saved, thereby saving a storage space and improving the processing efficiency.

In some embodiments, after the obtaining the display data processing result, the method further includes: adding a mark to the display data processing result.

It should be noted that adding a mark to the display data processing result can make it easy for the user to classify and view the display data stored or received by the user, and quickly determine whether the display data processing result includes the state parameter of display screen.

In some embodiments, after the obtaining the display data processing result, the method further includes: sending the display data processing result according to a first preset rule.

It should be noted that the display data processing result may be sent by sharing, sending an email or using other software, such as sending through WeChat.

In some embodiments, the first preset rule includes: determining whether a display screen of a receiving terminal is capable of deforming according to the state parameter of display screen when the type of the display data processing result includes the source file and the three-dimensional model; if so, sending the display data processing result in the type of source file; otherwise, sending the display data processing result in the type of three-dimensional model.

In some embodiments, the first preset rule further includes sending in a manner selected by the user. For example, for display data processing results obtained in a certain time period, three-dimensional models are sent; and for some objects, source files are sent by default.

Figure 4:
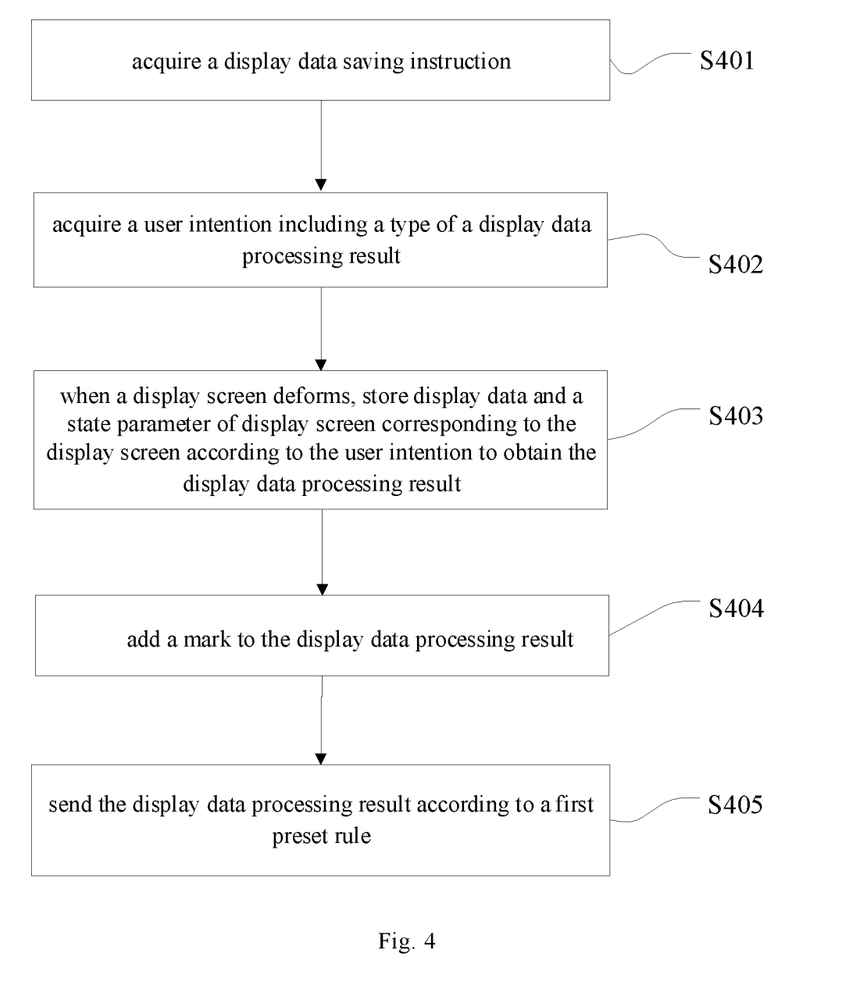
FIG. 4 is a flowchart illustrating an exemplary implementation of a display data processing method according to the First Embodiment of the present disclosure.

The above display data processing method is further illustrated in detail by an exemplary implementation with reference to FIG. 4. As shown in FIG. 4, the method may include operations S401 to S405.

At the operation S401, a display data saving instruction is acquired.

At the operation S402, a user intention including a type of a display data processing result is acquired.

At the operation S403, when a display screen deforms, display data and a state parameter of display screen corresponding to the display screen are stored according to the user intention to obtain the display data processing result.

At the operation S404, a mark is added to the display data processing result.

At the operation S405, the display data processing result is sent according to a first preset rule.

It should be noted that, when the type of the display data processing result includes a source file and a three-dimensional model, the method further includes: determining whether a display screen of a receiving terminal is capable of deforming according to the state parameter of display screen; if so, sending the display data processing result in the type of source file; otherwise, sending the display data processing result in the type of three-dimensional model.

With the display data processing result stored according to the user intention, the storage space of the terminal can be saved, resources occupied by the processing process and processing time taken by the processing process can be reduced, user needs can be better met, and the user experience can be improved.

The user intention may be acquired in a plurality of ways, such as asking a user, improving acquisition of the user intention by learning a user habit, and acquiring according to a rule preset by the user or others.

The display data processing result may be a tiled image as in the existing art, or may be understood as an image displayed by the display screen in a flat state stored by default regardless of a current deformation state of the display screen. The display data processing result may also be a tiled image together with a state parameter of display screen capable of being provided for other deformable terminals to deform accordingly. It should be noted that the state parameter of display screen acquired by the other terminals may be used directly or after being calculated and converted. For example, a first display data processing result in the type of source file (tiled image+state parameter of display screen) is obtained by performing screen capture on a first display screen; a second display screen determines whether the second display screen has the same deformation rule or in the same type as the first display screen after receiving the first display data processing result; if so, the state parameter of display screen is directly used by the second display screen to deform, a deformation state of the deformed second display screen is the same as that of the first display screen when the screen capture is performed, and the tiled image is displayed on the second display screen, at this time, the image displayed on the second display screen is in the same state as the image displayed on the first display screen when the screen capture is performed. According to a viewing guide or by other means, the user of the second display screen may watch the image the same as that displayed on the first display screen when the screen capture is performed by the user of the first display screen, that is, the image viewed by the user of the first display screen may be seen by the user of the second display screen.

Figure 5:
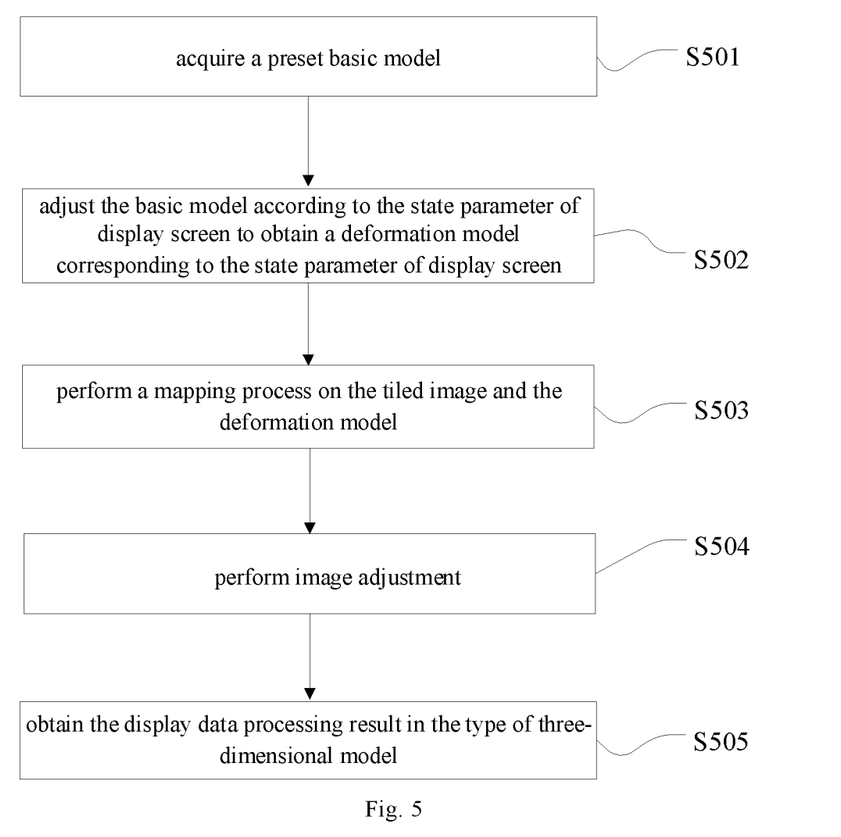
FIG. 5 is a flowchart illustrating another exemplary implementation of a display data processing method according to the First Embodiment of the present disclosure.

In some embodiments, as shown in FIG. 5, when the type of the display data processing result includes the three-dimensional model, the method further includes operations S501 to S505.

At the operation S501, a preset basic model is acquired.

At the operation S502, the basic model is adjusted according to the state parameter of display screen to obtain a deformation model corresponding to the state parameter of display screen.

At the operation S503, a mapping process is performed on the tiled image and the deformation model.

At the operation S504, image adjustment is performed.

At the operation S505, the display data processing result in the type of three-dimensional model is obtained.

According to the display data processing method provided by the embodiments of the present disclosure, the display data saving instruction is acquired; and when the display screen deforms, the display data and the state parameter of display screen corresponding to the display screen are stored to obtain the display data processing result. With the implementation of the method provided by the present disclosure, a deformation effect of a deformable display screen including a flexible screen can be recorded by screen capture, thereby meeting the user's requirement for recording an actual display effect and improving the user experience.

Furthermore, by acquiring the user intention, the display data can be processed accordingly, and an image at a corresponding angle or a video or a model at a changed viewing angle can be output according to an instruction of the user, so that a need of the user to record and share interesting images or videos displayed on the flexible screen can be satisfied, thereby meeting the user needs better and improving the user experience. Adding the mark to the display data processing result makes it easy for the user to further identify the display data processing result later and perform subsequent operations. Since the basic model is adjusted according to the state parameter of display screen to obtain the model corresponding to the state parameter of display screen and then the mapping process is performed on the tiled image and the deformation model to obtain the display data processing result in the type of three-dimensional model, when the user needs to share currently stored display data with other users which do not support displaying the display data processing result on a deformed display screen or which do not want to deform a display screen to display the display data processing result, the display data processing result can be seen intuitively instead of watching the tiled image inconsistent with an actual viewing effect.

Second Embodiment

Figure 6:
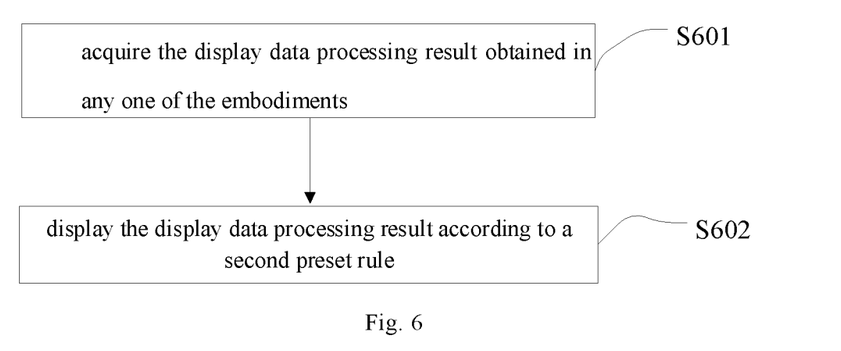
FIG. 6 is a flowchart illustrating a display method according to Second Embodiment of the present disclosure.

With reference to FIG. 6, a display method provided in the present embodiment includes: S601: acquiring the display data processing result obtained in any one of the above embodiments; and S602: displaying the display data processing result according to a second preset rule.

It should be noted that the second preset rule includes: determining whether a current display screen is capable of deforming according to the state parameter of display screen when a type of the display data processing result includes a source file and a three-dimensional model; if so, deforming the display screen according to the state parameter of display screen, and displaying a tiled image on the display screen; otherwise, displaying the display data processing result in the type of three-dimensional model on the display screen.

In some embodiments, if only one type of display data processing result is obtained, such as one of the source file, the tiled image and the three-dimensional model, the acquired display data processing result is directly displayed. In some embodiments, if a receiving terminal is incapable of displaying the acquired display data processing result normally, a display failure prompt may be sent to the sending terminal while being provided for a user at the receiving terminal.

In some embodiments, the display data processing result may be displayed according to a second preset rule set by the user. For example, it may be set to display three-dimensional models by default, or to display source files by default.

In some embodiments, if the current display screen is incapable of deforming according to the state parameter of display screen, it is set by default to display a tiled image or a three-dimensional model on the display screen.

In some embodiments, the second preset rule may be adjusted according to a learned user habit. For example, when it is learned that the user displays source files in the presence of WiFi while displays three-dimensional models or tiled images using traffic, the second preset rule is adjusted accordingly.

In some embodiments, the second preset rule may be set according to the usage time. For example, it is set to display three-dimensional models by default from 8 pm to 7 pm the next morning, and it is set not to display a display data processing result in the type of source file by default.

It should be noted that the display data processing result obtained in each of the above embodiments may be acquired by receiving the display data processing result sent by other terminals or other servers for displaying or by storing the display data of the terminal itself as the display data processing result for displaying. For example, a screen recording is made when a display screen of a terminal A is in a deformed state, the terminal A may display the screen recording according to the second preset rule when the terminal A checks the screen recording, that is, displays the screen recording. As another example, a display screen of a terminal B deforms from the 5th second to the 9th second in a process of making a 1-minute video by the terminal B, and a display data processing result in the type of (tiled image+ state parameter of display screen) is obtained. The terminal B sends the display data processing result to a terminal C through a server or Bluetooth. After receiving the display data processing result, the terminal C controls a display screen thereof to deform according to the state parameter of display screen when the display data processing result from the 5th second to the 9th second is displayed. It should be noted that, in a case where the display data processing result is a video, a tiled image of the video may be understood as images of all frames of the video.

According to the display method provided by the embodiments of the present disclosure, the display data processing result obtained in any one of the above embodiments is acquired and displayed according to the second preset rule. With the implementation of the method provided by the present disclosure, by acquiring the display data processing result, the three-dimensional model of the display data processing result can be displayed, or the display screen can be adjusted by deforming according to the state parameter of display screen in such a way that the display data processing result displayed on the adjusted display screen is consistent with the actual display effect, thereby satisfying the requirement of the user for viewing the actual display effect and improving the user experience.

Third Embodiment

Figure 7:
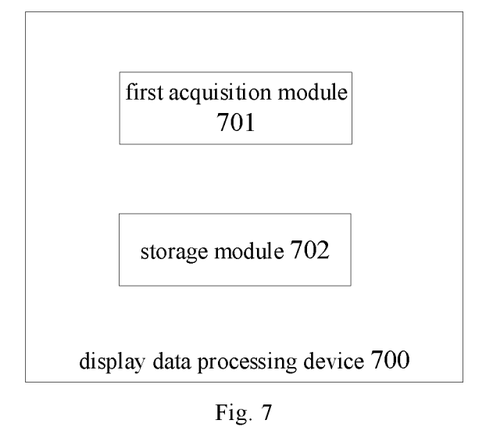
FIG. 7 is a schematic structural diagram of a display data processing device according to Third Embodiment of the present disclosure.

The present embodiment further provides a display data processing device. As shown in FIG. 7, a display data processing device 700 includes a first acquisition module 701 and a storage module 702.

The first acquisition module 701 is configured to acquire a display data saving instruction.

The storage module 702 is configured to store, when a display screen deforms, display data and a state parameter of display screen corresponding to the display screen to obtain a display data processing result.

It should be noted that the display data saving instruction in the embodiment of the present disclosure may be a screen capture instruction, or other instructions to store or cache display data, such as a photographing instruction, a video recording instruction and a screen recording instruction.

It should be noted that an instruction to store a displayed image or a displayed video is actually an instruction to store display data. Therefore, the instruction to store the displayed image or the displayed video is also included in the display data saving instruction claimed by the embodiment of the present disclosure.

It should be noted that, when the display data saving instruction is a video instruction, the embodiment of the present disclosure may be implemented as storing display data and a state parameter of display screen corresponding to a display screen when the display screen deforms to obtain a display data processing result. For example, if a display screen of a device B deforms from the 5th second to the 9th second in a process of making a 1-minute video by the device B, the display data and the state parameter of display screen from the 5th second to the 9th second are stored to obtain a display data processing result in a type of (tiled image+state parameter of display screen). It should be noted that, in a case where the display data processing result is a video, a tiled image of the video may be understood as images of all frames of the video.

The display data saving instruction may be sent by a terminal where a deformable display screen is located, or may be an instruction received by the terminal from other servers or other terminals.

It should be noted that at least one of display screens of the display data processing device provided by the embodiment of the present disclosure is a deformable display screen. For example, the display data processing device includes at least one flexible screen.

In some embodiments, a type of the display data processing result includes at least one of a source file or a three-dimensional model, and the source file includes a tiled image derived from the display data and the state parameter of display screen.

In some embodiments, the type of the data processing result may be a tiled image alone, so as to allow a user to share the tiled image with a mobile phone having a non-deformable display screen, or improve processing efficiency when the user only needs to store the tiled image.

In some embodiments, when the type of the display data processing result includes the three-dimensional model, the display data processing device further includes: a second acquisition module configured to acquire a preset basic model; a calculation module configured to adjust the basic model according to the state parameter of display screen to obtain a deformation model corresponding to the state parameter of display screen; and a processing module configured to perform a mapping process on the tiled image and the deformation model to obtain the display data processing result in the type of three-dimensional model.

It should be noted that the preset basic model may be preset according to a state parameter of display screen of the terminal. The preset basic model may also be obtained by setting according to the state parameter of display screen of the terminal and then adjusting by the user according to his/her preference.

It should be noted that, the mapping process of the tiled image and the deformation model may be performed in a pixel-to-pixel manner to obtain a three-dimensional model which restores an image displayed on the display screen when the terminal deforms and the display data saving instruction is received. For example, when a current state of a display screen is a folded state at a certain angle and an effect of a displayed image observed by the user is a state A, a display data processing result in the type of three-dimensional model, which is currently obtained by applying the method provided by the embodiment of the present disclosure, presents a three-dimensional image of the state A in the folded state at the certain angle.

In some embodiments, the processing module is further configured to perform image adjustment after performing the mapping process on the tiled image and the deformation model and obtain a display data processing result in the type of three-dimensional model.

It should be noted that the image adjustment in some embodiments includes, but is not limited to, at least one of: zooming, rotating, adjusting brightness, adjusting contrast, adding a sticker, adding text, or adding music. For example, when the obtained display data processing result in the type of three-dimensional model is at an angle A but an actual viewing angle of the user is an angle B, the user may adjust the angle of the display data processing result, so as to obtain the display data processing result which better meets real needs of the user.

In some embodiments, the state parameter of display screen includes, but is not limited to, at least one of: a display parameter of display screen or a deformation parameter of display screen.

It should be noted that the display parameter of display screen includes, but is not limited to, at least one of: the number of display screens or a full tile resolution of all sub-screens of a display screen.

In some embodiments, the deformation parameter of display screen is related to a deformation type of the display screen, and the deformation parameter of display screen is illustrated below by taking display screens in two common deformation types as an example. It should be noted that an exemplary description is given below, and for display screens in other deformation types, a well-known deformation parameter thereof or a deformation parameter thereof known by those of ordinary skill in the art may be used as the deformation parameter of display screen.

For an axially foldable display screen of a flexible system, the deformation parameter of display screen includes, but is not limited to, at least one of: the number of axes, a position of each axis, a bending direction of each axis, a rotation angle of each axis and curvature. It should be noted that the position of each axis may be marked by coordinate points in a preset coordinate system or marked with other feasible methods, and the method of marking the position of each axis is not limited in the embodiment of the present disclosure. It should be noted that the axes may be parallel to one another or not, which is not limited herein. FIG. 2A is a schematic diagram illustrating an undeformed state of an axially foldable display screen of a flexible system, the display screen includes a first axis 201 located at a position having a distance A from a left side of the display screen, and a second axis 202 located at a position having a distance B from a right side of the display screen. FIG. 2B is a schematic diagram illustrating a state of the display screen shown in FIG. 2A after the display screen deforms. In such state, the deformation parameter of display screen further includes a downward bending direction of the first axis 201, an upward bending direction of the second axis 202, a rotation angle R1 of the first axis 201, a rotation angle R2 of the second axis 202, and curvature, and the curvature may be obtained by determining an orthogonal curve of each pixel along an axial direction in the display screen and calculating orthogonal curvature of each orthogonal curve.

For an array-substrate-type display screen of a flexible system, the deformation parameter of display screen includes, but is not limited to, a layout of array matrices in different directions and curvature. It should be noted that FIGS. 3A and 3B are only used for illustrating the array-substrate-type display screen of the flexible system, and the technical solution of the embodiment of the present disclosure may also be applicable to display screens with other layouts. FIG. 3A is a schematic diagram illustrating an undeformed state of an array-substrate-type display screen of a flexible system, and a layout of array matrices of the display screen is A-M in a horizontal direction and 1-8 in a vertical direction. FIG. 3B is a schematic diagram illustrating a state of the display screen shown in FIG. 3A after the display screen deforms. In such state, the deformation parameter of display screen further includes curvature of each detection point at the center of a detection array, and the curvature is calculated by a formula of k=2δ/ED, where k is curvature of the detection point, δ is a pressure value of the detection point, E is an elastic modulus of a material of the flexible screen, and D is a thickness of the flexible screen.

In some embodiments, the display data processing device further includes a third acquisition module configured to acquire a user intention including a type of a display data processing result after the first acquisition module acquires the display data saving instruction. The storage module is further configured to store, when the display screen deforms, display data and a state parameter of display screen corresponding to the display screen according to the user intention to obtain the display data processing result.

It should be noted that the user intention may be acquired by popping up a dialogue box in a display interface of the display screen for inquiring the user intention every time, or may be set by the user or a system. Or, a type of a current display data processing result may be automatically set after a learning process is performed according to a user habit.

For example, when the acquired user intention indicates that the user wants to store a source file, only the source file is stored and the time for generating a three-dimensional model is saved, thereby saving the storage space and improving the processing efficiency.

In some embodiments, the display data processing device further includes a marking module configured to add a mark to the display data processing result after the storage module obtains the display data processing result.

It should be noted that adding a mark to the display data processing result can make it easy for the user to classify and view the display data stored or received by the user, and quickly determine whether the display data processing result includes the state parameter of display screen.

In some embodiments, the display data processing device further includes a sending module configured to send the display data processing result according to a first preset rule after the display data processing result is obtained.

It should be noted that the display data processing result may be sent by sharing, sending an email or using other software, such as sending through WeChat.

In some embodiments, the first preset rule includes: determining whether a display screen of a receiving terminal is capable of deforming according to the state parameter of display screen when the type of the display data processing result includes the source file and the three-dimensional model; if so, sending the display data processing result in the type of source file; otherwise, sending the display data processing result in the type of three-dimensional model.

In some embodiments, the first preset rule further includes sending in a manner selected by the user. For example, for display data processing results obtained in a certain time period, three-dimensional models are sent; and for some objects, source files are sent by default.

It should be noted that the display data processing result may be a tiled image as in existing art, or may be understood as an image displayed by the display screen in a flat state stored by default regardless of a current deformation state of the display screen. The display data processing result may also be a tiled image together with a state parameter of display screen capable of being provided for other deformable terminals or devices to deform accordingly. It should be noted that the state parameter of display screen acquired by the other terminals or devices may be used directly or after being calculated and converted. For example, a first display data processing result in the type of source file (tiled image+state parameter of display screen) is obtained by performing screen capture on a first display screen; a second display screen determines whether the second display screen has the same deformation rule or in the same type as the first display screen after receiving the first display data processing result; if so, the state parameter of display screen is directly used by the second display screen to deform, a deformation state of the deformed second display screen is the same as that of the first display screen when the screen capture is performed, and the tiled image is displayed on the second display screen, at this time, the image displayed on the second display screen is in the same state as the image displayed on the first display screen when the screen capture is performed. According to a viewing guide or by other means, the user of the second display screen may watch the image the same as that displayed on the first display screen when the screen capture is performed by the user of the first display screen, that is, the image viewed by the user of the first display screen may be seen by the user of the second display screen.

With the display data processing device provided by the embodiments of the present disclosure, the first acquisition module acquires the display data saving instruction; and the storage module stores, when the display screen deforms, the display data and the state parameter of display screen corresponding to the display screen to obtain the display data processing result. With the implementation of the device provided by the present disclosure, a deformation effect of a deformable display screen including a flexible screen can be recorded by screen capture, thereby meeting the user's requirement for recording an actual display effect and improving the user experience.

Furthermore, the third acquisition module acquires the user intention for the storage module to process the display data accordingly, so that the user needs are met better and the user experience is improved. The marking module adds a mark to the display data processing result, which makes it easy for the user to further identify the display data processing result later and perform subsequent operations. The processing module adjusts the basic model according to the state parameter of display screen to obtain the model corresponding to the state parameter of display screen and then performs the mapping process on the tiled image and the deformation model, and the storage module obtains the display data processing result in the type of three-dimensional model, therefore, when the user needs to share currently stored display data with other users which do not support displaying the display data processing result on a deformed display screen or which do not want to deform a display screen to display the display data processing result, the display data processing result can be seen intuitively instead of watching the tiled image inconsistent with an actual viewing effect.

Fourth Embodiment

Figure 8:
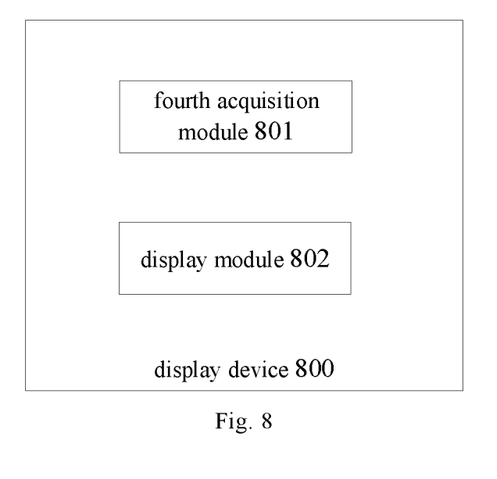
FIG. 8 is a schematic structural diagram of a display device according to Fourth Embodiment of the present disclosure.

As shown in FIG. 8, the present embodiment further provides a display device 800, including: a fourth acquisition module 801 configured to acquire the display data processing result obtained in any one of the above embodiments; and a display module 802 configured to display the display data processing result according to a second preset rule.

It should be noted that the second preset rule includes: determining whether a current display screen is capable of deforming according to the state parameter of display screen when a type of the display data processing result includes a source file and a three-dimensional model; if so, deforming the display screen according to the state parameter of display screen, and displaying a tiled image on the display screen; otherwise, displaying the display data processing result in the type of three-dimensional model on the display screen.

In some embodiments, if only one type of display data processing result is obtained, such as one of the source file, the tiled image and the three-dimensional model, the acquired display data processing result is directly displayed. In some embodiments, if a receiving terminal is incapable of displaying the acquired display data processing result normally, a display failure prompt may be sent to the sending terminal while being provided for a user at the receiving terminal.

In some embodiments, the display data processing result may be displayed according to a second preset rule set by the user. For example, it may be set to display three-dimensional models by default, or to display source files by default.

In some embodiments, if the current display screen is incapable of deforming according to the state parameter of display screen, it is set by default to display a tiled image or a three-dimensional model on the display screen.

In some embodiments, the second preset rule may be adjusted according to a learned user habit. For example, when it is learned that the user displays source files in the presence of WiFi while displays three-dimensional models or tiled images using traffic, the second preset rule is adjusted accordingly.

In some embodiments, the second preset rule may be set according to the usage time. For example, it is set to display three-dimensional models by default from 8 pm to 7 pm the next morning, and it is set not to display a display data processing result in the type of source file by default.

It should be noted that the display data processing result obtained in each of the above embodiments may be acquired by receiving the display data processing result sent by other terminals or other servers for displaying or by storing the display data of the display device itself as the display data processing result for displaying. For example, a screen recording is made when a display screen of a display device A is in a deformed state, the display device A may display the screen recording according to the second preset rule when the display device A checks the screen recording, that is, displays the screen recording. As another example, a display screen of a terminal B deforms from the 5th second to the 9th second in a process of making a 1-minute video by the terminal B, and a display data processing result in the type of (tiled image+state parameter of display screen) is obtained. The terminal B sends the display data processing result to a terminal C through a server or Bluetooth. After receiving the display data processing result, the terminal C controls a display screen thereof to deform according to the state parameter of display screen when the display data processing result from the 5th second to the 9th second is displayed. It should be noted that, in a case where the display data processing result is a video, a tiled image of the video may be understood as images of all frames of the video.

With the display device provided by the embodiments of the present disclosure, the fourth acquisition module acquires the display data processing result obtained in any one of the above embodiments and the display module displays the display data processing result according to the second preset rule. With the implementation of the device provided by the present disclosure, according to the acquired display data processing result, the three-dimensional model of the display data processing result can be displayed, or the display screen can be adjusted by deforming according to the state parameter of display screen in such a way that the display data processing result displayed on the adjusted display screen is consistent with the actual display effect, thereby satisfying the requirement of the user for viewing the actual display effect and improving the user experience.

Fifth Embodiment

Figure 9:
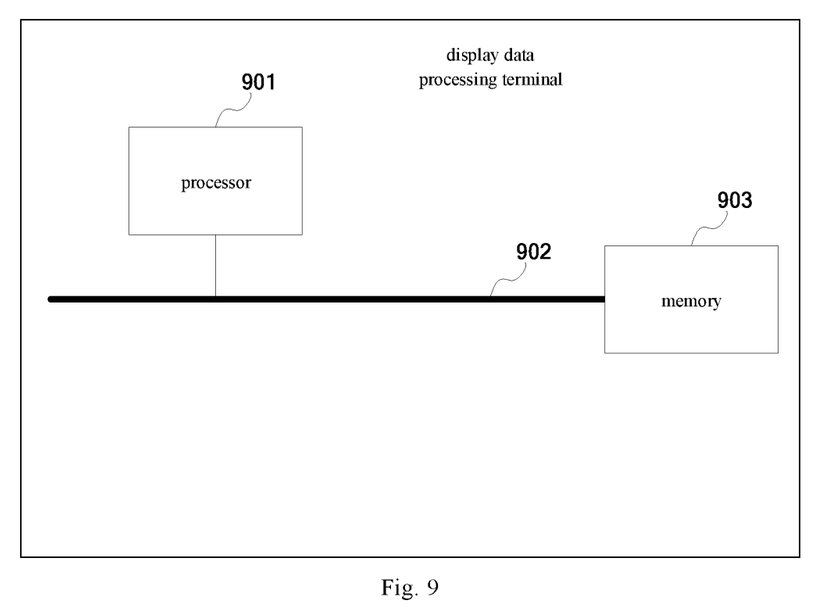
FIG. 9 is a schematic structural diagram of a display data processing terminal according to Fifth Embodiment of the present disclosure.

The present embodiment further provides a display data processing terminal. As shown in FIG. 9, a display data processing terminal includes a processor 901, a memory 903 and a communication bus 902. The communication bus 902 is configured to enable connection and communication between the processor 901 and the memory 903; and the processor 901 is configured to execute one or more computer programs stored in the memory 903 to implement at least one operation of the display data processing method provided in each of the above embodiments.

Sixth Embodiment

Figure 10:
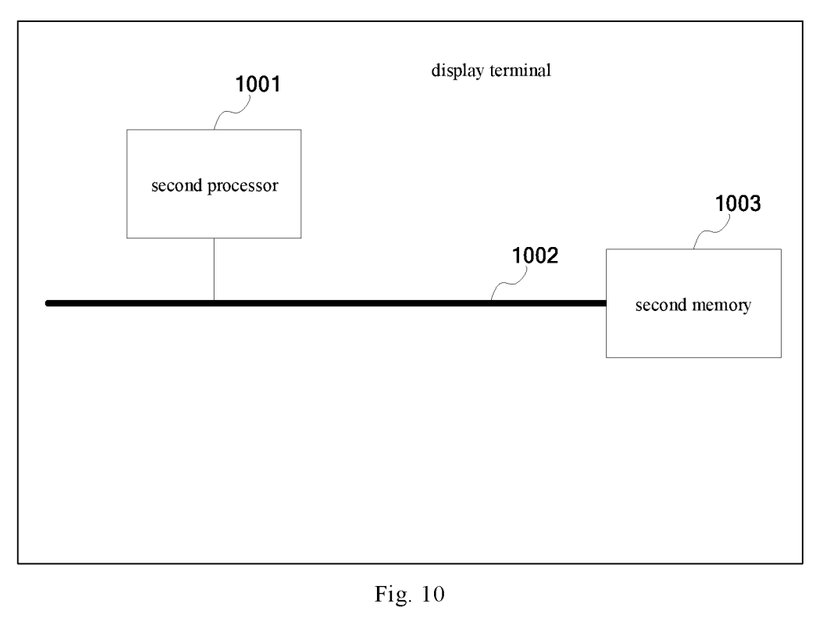
FIG. 10 is a schematic structural diagram of a display terminal according to Sixth Embodiment of the present disclosure.

The present embodiment further provides a display terminal. As shown in FIG. 10, a display terminal includes a second processor 1001, a second memory 1003 and a second communication bus 1002. The second communication bus 1002 is configured to enable connection and communication between the second processor 1001 and the second memory 1003; and the second processor 1001 is configured to execute one or more computer programs stored in the second memory 1003 to implement at least one operation of the display method provided in each of the above embodiments.

Seventh Embodiment

The present embodiment further provides a computer-readable storage medium, which includes volatile/nonvolatile and removable/non-removable media used in any method or technology for storing information (such as computer-readable instructions, data structures, computer program modules or other data). The computer-readable storage medium includes, but is not limited to, a Random Access Memory (RAM), a Read-Only Memory (ROM), an Electrically Erasable Programmable Read-Only Memory (EEPROM), a flash memory or other storage technology, a Compact Disc Read-Only Memory (CD-ROM), a Digital Video Disk (DVD) or other optical discs, a magnetic cassette, a magnetic tape, a magnetic disk or other magnetic storage devices, or any other medium which can be used to store the desired information and can be accessed by a computer.

The computer-readable storage medium provided by the present embodiment may be configured to store one or more computer programs capable of being executed by a processor to implement at least one operation of the display data processing method and/or the display method provided in each of the above embodiments.

The present embodiment further provides a computer program (or computer software), which may be distributed on a computer-readable medium and executed by a computing device to implement at least one operation of the display data processing method and/or the display method provided in each of the above embodiments. In some cases, at least one operation illustrated or described herein may be executed in an order different from that described in the above embodiments.

It should be understood that at least one operation illustrated or described herein may be executed in an order different from that described in the above embodiments in some cases.

The present embodiment further provides a computer program product, including a computer-readable device having the above computer program stored therein. In the present embodiment, the computer-readable device may include the above computer-readable storage medium.

Apparently, it should be understood by those of ordinary skill in the art that the functional modules/units in all or some of the operations, the systems and the devices in the methods disclosed above may be implemented as software (which may be implemented as computer program codes executable by a computing device), firmware, hardware, or suitable combinations thereof. If implemented as hardware, the division between the functional modules/units described above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit.

In addition, it is well known by those of ordinary skill in the art that communication media generally include computer-readable instructions, data structures, computer program modules or other data in a modulated data signal, such as a carrier wave or other transmission mechanism, and can include any information delivery media. Therefore, the present disclosure is not limited to any specific combination of hardware and software.

The above is a further detailed description of the embodiments of the present disclosure in conjunction with the exemplary implementations, but the exemplary implementations of the present disclosure are not limited to the above description. Several simple deductions or substitutions can be made by those of ordinary skill in the art without departing from the concept of the present disclosure, and should be considered to fall within the scope of the present disclosure.

What is claimed is:

1. A display data processing method, comprising:
    acquiring a display data saving instruction; and
    storing, when a first display screen deforms, display data and a state parameter of display screen corresponding to the first display screen to obtain a display data processing result, wherein the state parameter of display screen is used for enabling a second display screen of a terminal receiving the display data processing result to deform based on the state parameter of display screen.

2. The display data processing method of claim 1, wherein a type of the display data processing result comprises at least one of:
    a source file or a three-dimensional model,
    wherein the source file comprises a tiled image derived from the display data and the state parameter of display screen.

3. The display data processing method of claim 2, in a case where the type of the display data processing result comprises the three-dimensional model, after the acquiring the display data saving instruction, the method further comprises:
    acquiring a preset basic model;
    adjusting the basic model according to the state parameter of display screen to obtain a deformation model corresponding to the state parameter of display screen; and
    performing a mapping process on the tiled image and the deformation model to obtain the display data processing result in the type of three-dimensional model.

4. The display data processing method of claim 3, after the performing the mapping process on the tiled image and the deformation model, further comprising:
    performing image adjustment; and
    obtaining the display data processing result in the type of three-dimensional model.

5. The display data processing method of claim 1, after the acquiring the display data save instruction, further comprising:
    acquiring a user intention comprising a type of the display data processing result;
    and storing, when the first display screen deforms, the display data and the state parameter of display screen corresponding to the first display screen according to the user intention to obtain the display data processing result; and
    adding a mark to the display data processing result.

6. The display data processing method of claim 2, after the obtaining the display data processing result, further comprising: in a case where the type of the display data processing result comprises the source file and the three-dimensional model, determining whether a display screen of a receiving terminal is capable of deforming according to the state parameter of display screen; if so, sending the display data processing result in the type of source file; otherwise, sending the display data processing result in the type of three-dimensional model.

7. A display method, comprising:
    acquiring the display data processing result obtained according to claim 2;
    in a case where the type of the display data processing result comprises the source file and the three-dimensional model, determining whether a current display screen is capable of deforming according to the state parameter of display screen;

if so, deforming the current display screen according to the state parameter of display screen, and displaying the tiled image on the current display screen;

otherwise, displaying the display data processing result in the type of three-dimensional model on the current display screen.

8. A display data processing device, comprising a processor, and a memory having a program stored therein which, when executed by the processor, causes the processor to:

acquire a display data saving instruction; and store, when a first display screen deforms, display data and a state parameter of display screen corresponding to the first display screen to obtain a display data processing result, wherein the state parameter of display screen is used for enabling a second display screen of a terminal receiving the display data processing result to deform based on the state parameter of display screen.

9. The display data processing device of claim 8, wherein a type of the display data processing result comprises at least one of:

a source file or a three-dimensional model, wherein the source file comprises a tiled image derived from the display data and the state parameter of display screen.

10. The display data processing device of claim 9, in a case where the type of the display data processing result comprises the three-dimensional model, the program, when executed by the processor, further causes the processor to:

acquire a preset basic model;

adjust the basic model according to the state parameter of display screen to obtain a deformation model corresponding to the state parameter of display screen; and perform a mapping process on the tiled image and the deformation model to obtain the display data processing result in the type of three-dimensional model.

11. The display data processing device of claim 9, wherein the program, when executed by the processor, further causes the processor to:

acquire a user intention comprising the type of the display data processing result after acquiring the display data saving instruction;

store, when the first display screen deforms, the display data and the state parameter of display screen corresponding to the first display screen according to the user intention to obtain the display data processing result; and/or add a mark to the display data processing result after obtaining the display data processing result.

12. The display data processing device of claim 8, wherein the program, when executed by the processor, further causes the processor to:

in a case where the type of the display data processing result comprises the source file and the three-dimensional model, determine whether a display screen of a receiving terminal is capable of deforming according to the state parameter of display screen;

if so, send the display data processing result in the type of source file;

otherwise, send the display data processing result in the type of three-dimensional model.

13. A display device, comprising a processor, and a memory having a program stored therein which, when executed by the processor, causes the processor to:

acquire the display data processing result obtained according to claim 9;

determine whether a current display screen is capable of deforming according to the state parameter of display screen when the type of the display data processing result comprises the source file and the three-dimensional model;

if so, deform the current display screen according to the state parameter of display screen, and display the tiled image on the current display screen;

otherwise, display the display data processing result in the type of three-dimensional model on the current display screen.

14. A display data processing terminal, comprising: a processor, a memory and a communication bus;

wherein the communication bus is configured to enable connection and communication between the processor and the memory; and the processor is configured to execute one or more computer programs stored in the memory to perform the method of claim 1.

15. A non-transitory readable storage medium having one or more computer programs stored thereon, wherein the one or more computer programs are executable by one or more processors to perform the method of claim 1.

* * * * *